United States Patent
Koenck et al.

(10) Patent No.: US 7,509,141 B1
(45) Date of Patent: Mar. 24, 2009

(54) SOFTWARE DEFINED RADIO COMPUTING ARCHITECTURE

(75) Inventors: Steven E. Koenck, Cedar Rapids, IA (US); Allen P. Mass, Lisbon, IA (US); Julianne R. Crosmer, Cedar Rapids, IA (US); Gregory A. Arundale, Marion, IA (US); Joel M. Wichgers, Urbana, IA (US); James A. Marek, Anamosa, IA (US); David W. Fitkin, Anamosa, IA (US); David A. Haverkamp, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 458 days.

(21) Appl. No.: 11/239,668

(22) Filed: Sep. 29, 2005

(51) Int. Cl.
*G06F 13/00* (2006.01)
*H04Q 11/00* (2006.01)

(52) U.S. Cl. .................. 455/552.1; 370/387; 710/317

(58) Field of Classification Search ............ 370/271, 370/219, 220, 387, 388, 422, 218, 386, 392, 370/395.31; 455/428; 710/317
See application file for complete search history.

(56) References Cited

U.S. PATENT DOCUMENTS

| | | | | |
|---|---|---|---|---|
| 6,041,035 A | * | 3/2000 | Thedens | ............ 370/217 |
| 2006/0184855 A1 | * | 8/2006 | Wang et al. | ............ 714/755 |
| 2007/0088553 A1 | * | 4/2007 | Johnson | ............ 704/257 |
| 2007/0124565 A1 | * | 5/2007 | Jones et al. | ............ 712/201 |
| 2007/0276959 A1 | * | 11/2007 | Yancey et al. | ............ 709/238 |

OTHER PUBLICATIONS

A Software Communications Architecture Compliant Software Defined Radion Implementation; A Thesis Presented by Sabri Murat Bicer; Northeastern University, Boston, Massachusetts; Jun. 2002.
GNU Radio—The GNU Software Radio; http://www.gnu.org/software/gnuradio/gnuradio/html; Jul. 31, 2005.
Esa SpaceWire; A New Payload Architecture based on SpaceWire; http://www.estec.esa.nl/tech/spacewire/overview/; Aug. 11, 2005.
The Future of Mobile Radio; EDACS® ProVoice™ Orion™ System/Scan Mobile; Tyco Electronics; Copyright© 2003 M/A-COM, Inc.

* cited by examiner

*Primary Examiner*—Nick Corsaro
*Assistant Examiner*—Shannon R Brooks

(57) ABSTRACT

An improved architectural approach for implementation of a low power, scalable topology for a software defined radio (SDR). Low power processors and switching elements forming building blocks are employed in an embedded switched fabric architecture network having a repeating building block topology that advantageously employs wormhole routing and has self-healing, fail-safe properties. Differential signaling is used and data rates in excess of 250 Mbps are possible. In one embodiment a dual civilian and military channel SDR is disclosed; in other embodiments, a plurality of independent SDR channels, with or without encryption, are disclosed. A plurality of different topologies are disclosed including torodial topologies having a planar topology with orthogonal connections, a planar topology with orthogonal and diagonal connections, and a cube topology with both orthogonal and/or diagonal connections.

13 Claims, 9 Drawing Sheets

SOFTWARE DEFINED RADIO COMPUTING ARCHITECTURE

CROSS-REFERENCE TO RELATED APPLICATIONS

This application is filed concurrently with commonly assigned, non-provisional U.S. patent application Ser. No. 11/238,824, entitled "COMMERCIAL JTRS ARCHITECTURE WITH MILITARY CAPABILITIES", listing as inventors Steven E. Koenck, Joel M. Wichgers, Andrew M. Vessel, Frank Pourahmadi, Demetri Tsamis.

BACKGROUND OF THE INVENTION

1. Field of Invention

The present invention relates generally to the field of software defined radio (SDR) in mixed-signal communication channels.

2. Description of Related Art

A modem is a device for modulating and demodulating a signal that typically has digital information therein, hence the term "modem" for modulator/demodulator. The signal is constructed to be suitable for the relevant transmission medium and is typically transmitted as an analog signal.

Modems have been used to communicate via telephone lines, with an analog carrier signal encoded with digital information, but modems can be used over any medium for transmitting signals, including over-the-air radio waves. Radio waves are generally defined to include the band of radio frequencies in the electromagnetic spectrum from 3 kHz to 300 GHz, from the Extremely Low Frequency (ELF) to Extremely High Frequency (EHF) bands respectively.

In this application, modem is used as a term for "modem control", meaning managed resources for waveform modulation and demodulation schemes of the kind used in radio data transmission, including but not limited to Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like.

A software defined radio is a radio that functions like a computer, where the functionality of the radio is defined by software that can be upgraded, rather than by fixed hardware. SDR has been defined as a radio whose signal processing functionality is defined in software; where the waveforms are generated as sampled digital signals, converted from digital to analog via a high-speed Digital-to-Analog Converter (D/A) and then translated to Radio Frequency (RF) for wireless propagation to a receiver. The receiver typically employs an RF subsystem coupled to a high-speed Analog-to-Digital Converter (A/D) that can capture some or all of the channels of the software radio node. The receiver then extracts and demodulates the channel waveform using software executing on a digital processor.

SDR is aimed at solving several of the challenges of over-the-air communications, including compatibility with pre-existing legacy radio systems, ability to emulate transmission and reception of a plurality of different waveforms or forms of modulation (modem control), and more efficient spectrum usage, including operation in different frequency bands, with the lowest possibility of interception, detection and interference from unauthorized parties. One of the first SDRs was the SPEAKeasy SDR, known per se in the art. The GNU Software Radio project (www.gnu.org/software/gnuradio/gnuradio.html) is another well documented SDR initiative.

The US military through the Department of Defense (DoD) has driven the development of next generation SDR with an Open Standard Architecture standard for implementing Joint Tactical Radio Systems (JTRS), which is used to communicate in military communication systems, through the use of an open standard Software Communications Architecture (SCA). The SCA calls out the following features: a Common Open Architecture; the ability to support multiple domains, including airborne, fixed, maritime, vehicular, dismounted and handheld applications; the ability to operate in multiple frequency bands; compatibility with legacy radio systems; the ability to easily insert new technologies to improve performance; enhanced security, including cryptographic capability, user identification and authentication, encryption key management, and multiple independent levels of security classification; networking ability, including support for legacy network protocols; software reusability; and support for plug-and-play and real-time reconfigurability, with waveforms being portable from one implementation to another.

The SCA provides standardization of hardware platforms and waveform application software to enable portability and interoperability over the life cycle of military communication systems. Implementing the SCA, however, introduces overhead that can require substantial additional computing capacity. Current JTRS implementations have used very high speed Commercial-Off-The-Shelf (COTS) microprocessors to achieve the necessary processing capacity at an acceptable price. Small form factor and power constrained applications often cannot tolerate the power required or heat generated by these implementations. Further, military systems need enhanced levels of security capability that may not be possible with COTS components. Still further, military systems need to be scalable to enable a common architectural approach for hosting either relatively small, simple waveforms or large complex waveforms. Prior art scalable architectures typically employ multiple distributed processors communicating with each other over an interconnecting network. An example prior art interconnecting network is the European Space Agency SpaceWire network standard that is described at http://www.estec.esa.nl/tech/spacewire/overview/.

What is needed is a new architectural approach for an SDR that is scalable, low power, high speed, SCA compliant and capable of enhanced security. Thus, the present invention provides a superior method and apparatus for an SDR that is DoD SCA compliant, of the kind used in JTRS systems.

SUMMARY OF THE INVENTION

Accordingly, an aspect of the present invention is to provide an improved architecture for implementing a DoD SCA compliant operating environment of the kind used in JTRS systems. To this end, a scalable, embedded grid computing architecture has been conceived.

In all the preferred exemplary embodiments taught in the present invention, a unique architectural approach is disclosed for implementation of a low power, scalable computing environment. This computing environment is applied to hosting software defined radio (SDR) waveform application software that is compliant with the Software Communications Architecture (SCA). The computing environment comprises a plurality of processors, which may be Network Processors or low power processors such as the Rockwell Collins Advanced Architecture MicroProcessor (AAMP), ARM, XScale, Tensilica Xtensa or Advanced Reconfigurable Computers (ARC) processors, to form an embedded switched fabric network for a SDR computing architecture topology that is compliant with the SCA.

The architecture of the present invention, when implemented in either hardware, software or preferably programmable hardware such as a general purpose processor (GPP), programmable Application Specific Integrated Circuit (ASIC) or Field Programmable Gate Array (FPGA), is low power, scalable and can communicate at data rates in excess of 250 Mbps.

The present invention can further be provided with Multiple Independent Levels of Security (MILS) capability.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
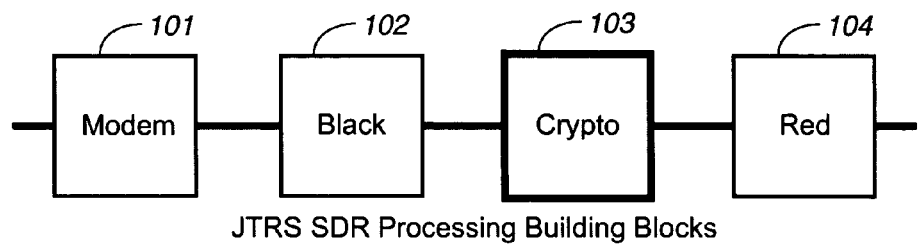
FIG. 1 is a schematic of the basic prior art elements used to construct a tactical software defined radio.

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

FIG. 1 shows the basic prior art SDR elements used to construct a tactical software defined radio according to the JTRS. These elements include a processor, such as a Rockwell Collins Advanced Architecture MicroProcessor (AAMP), an ARM processor, an XScale processor, or a DSP, and any necessary associated memory. The processors are preferably of a kind that are scalable and low power.

In FIG. 1 the elements are labeled the "Modem" block (for Modulator/Demodulator) 101, the Black processor block 102, the Crypto block 103, and the Red processor block 104. The elements are operatively connected to communicate with one another along communication lines. The Modem Block 101 converts an analog signal into digital baseband data using either analog or digital signal processing methods, with programmable digital signal processing methods being the preferred approach for software defined radios. The Block processor block 102 is typically a general purpose processor that processes information that is either unclassified or encrypted, so inadvertent loss of this data would not compromise security. The Red processor block 104 is also typically a general purpose processor that processes sensitive information that must be protected from loss. The Crypto block 103 contains appropriate circuitry for cryptographic algorithms of the type specified by the National Security Agency (NSA) to protect sensitive information. Movement of information from the Red processor to the Black processor is managed according to a security policy resident on the Red processor that ensures that sensitive information is encrypted, and only unclassified information is passed to the black processor without encryption. These four processing blocks are the fundamental building block elements of a typical tactical software defined radio, and form some of the basic elements of the present invention. These fundamental building block elements are interconnected in a topology as taught by the present invention to provide scalability and increase performance. The functionality and behavior of each of the processing blocks in FIG. 1, including the crypto block, is controlled by a software program associated with each particular building block. The software program may be stored with each particular building block, or it may be stored in a shared central storage area and loaded into each particular building block as needed, or it may be stored in multiple locations to enhance the reliability or improve the integrity of SCAPE*Net operation.

Figure 2:
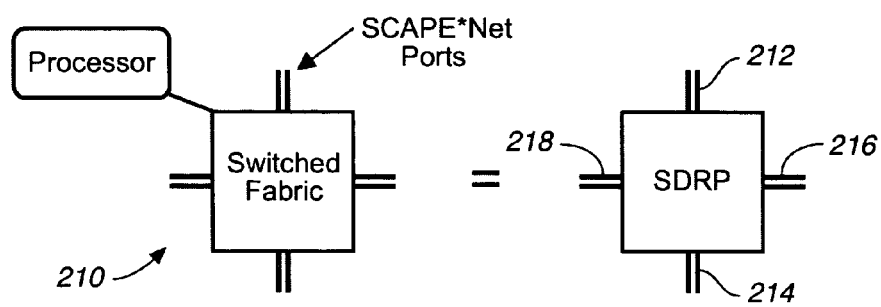
FIG. 2 is a schematic of a modular processing building block comprising a processor and a switched fabric network element that make up an SCA Processing Environment Network (SCAPE*Net) Software Defined Radio Processor (SDRP) node according to the teachings of the present invention.

In FIG. 2 there is schematic of a modular processing building block module comprising a processor and a switched fabric network element (under the control of the processor, which generally resides in the module) that make up an SCA Processing Environment Network (SCAPE*Net) module node 210, also termed a Software Defined Radio Processor (SDRP) block. The switched fabric network comprises a plurality of such switching fabric nodes forming a grid, comprising switching elements, operatively under the control of at least one processor, each of the nodes having a plurality of input and output ports that may perform multiplexing by time division and/or space division. The switches may operate in a "pass-through" mode, where routing information contained in the packet header is analyzed, and upon determination of the routing path through the switch element, the packet is routed to the appropriate switch port with minimum delay. Alternatively, the switches may operate in a store-and-forward mode with suitable buffers to store message cells or packets of data, the packets having a header, trailer and payload, as explained further herein. The processor and switching fabric element together constitute a Software Defined Radio Processor block (SDRP), as so labeled in FIG. 2, and together with other such SDRP blocks (e.g., Modem, Black, Red and Crypto, as defined herein) form the Software Communications Architecture (SCA) Processing Environment Network of the present invention. The entire computing architecture of the present invention can be labeled the "SCAPE*Net". Communication between SDRP blocks is embedded, fast and of low power, and may be CORBA [Common Object Request Broker Architecture (Object Management Group)] compliant. In general, the processor of the SDRP blocks may be any one of several types of processor, including a general purpose computing processor, digital signal processor (DSP), or cryptographic processor, customized ASIC or FPGA, and any necessary memory.

The software program controlling the present invention may be stored with each particular building block, maybe distributed across the network (e.g., peer-to-peer), or it may be stored in a shared central storage area and loaded into each particular building block as needed, or it may be stored in multiple locations to enhance the reliability or integrity of the network.

The modular building block of the SDRP is configured with a plurality of ports, e.g., reference numbers 212 (North or up), 214 (South or down), 216 (East or to the right) and 218 (West or to the left) from the SDRP node in FIG. 2, to allow insertion of the SDRP block into an orthogonal grid topology network that extends along communication lines running North-South and East-West. As explained further herein, in general any number of ports can be found on any given SDRP block, not just four ports as shown in FIG. 2 by way of example.

The SCAPE*Net switched fabric network preferably uses a "wormhole" router approach, whereby the router examines the destination field in the packet header. Wormhole routing is a system of simple routing in computer networking based on known fixed links, typically with a short address. Upon recognition of the destination, validation of a header checksum, and verification that the route is allowed for network security, the packet is immediately switched to an output port with minimum time delay. The wormhole router can be a 5-port device, with connections to four external ports plus the internal connection to a processor. The network transport protocol provides reliable delivery by the use of an acknowledge or negative acknowledge (ACK/NAK) response to the source from the destination. If an acknowledgement is not received within a specified time period, the transmission will be considered faulty and retransmission of the packet will be initiated by the source. Simultaneous attempts to transmit on a single switched fabric output port will result in a successful transmission for the first requestor, and blocked transmission for any subsequent requestors. The blocked transmissions will fail, resulting in a timeout indication. Furthermore, while it is not seen as necessary for sufficient network performance, it would be possible to provide buffering at each of the outgoing ports of the router with a relatively small buffer memory that could be used to store a blocked packet and transmit it immediately upon completion of the blocking transmission or at a fixed or random delay following the completion of the blocking transmission. Analysis can be conducted to predict the potential performance improvement.

Figure 3:
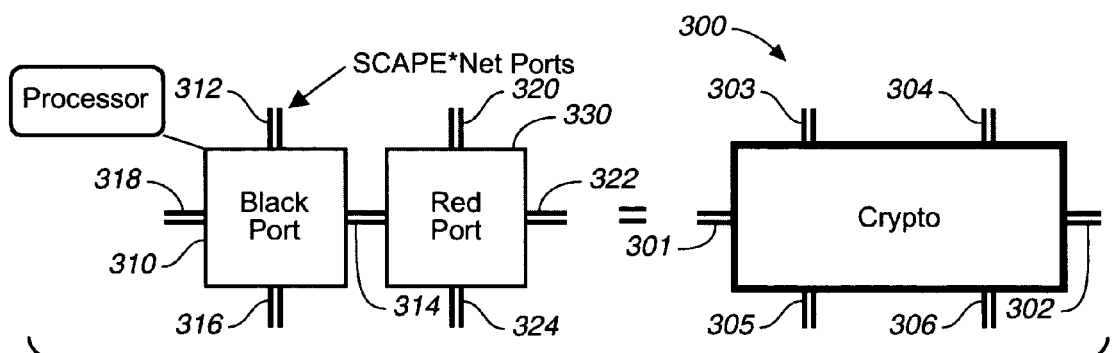
FIG. 3 is a SCAPE*Net module comprising a crypto module.

FIG. 3 is a SCAPE*Net module comprising a crypto module 300. A crypto module might be thought of as a special case of a SCAPE*Net module, whereby two network ports, Black and Red, are implemented. Two network ports make it possible for access to the two sides (Black & Red) of the crypto unit to maintain physical separation of encrypted and unencrypted information. The crypto module block 300 comprises a Black block, 310, with ports 312, 316, 314 and 318 (North, South, East and West), and a Red block, 330, with associated ports, 314, 320, 324 and 322 (West, North, South, East), each in communication with one another, and having at least one processor therein, forming six SCAPE*Net Crypto ports as shown (ports 301, 302, 303, 304, 305, 306 in FIG. 3). Two network Crypto ports 301 and 302, the West and East Crypto ports, make it possible to access the Black and Red blocks in a network switch configuration. The other Crypto ports, 303, 304, 305, 306, the North and South Crypto ports, make it possible for the crypto module 300 to communicate with similar crypto modules forming the SCAPE*Net topology, as explained further herein. Thus, for the FIG. 3 SCAPE*Net crypto module node 300, ports 301, 302 are for East-West network communication for the SCAPE*Net network comprising SDRP block nodes, allowing access to two sides of the Black and Red blocks forming the crypto module unit 300, while ports 303, 304, 305, 306 of node 300 are for North-South communication between SCAPE*NET crypto nodes similar to SCAPE*NET crypto node 300.

The Crypto block 300 has appropriate circuitry to decrypt and encrypt data passing through it, such as decrypting any encrypted black data passed through the Black port portion of the Crypto block, and converting this data into red data, that can be passed through the Red port portion of the Crypto block.

In an alternate embodiment (not shown) wherein the SCAPE*Net switched fabric network provides multiple independent levels of security, the crypto block 300 could be implemented as a simple SCAPE*Net node such as 210 of FIG. 2.

The switch fabric of the present invention is optimized for a packet switching architecture with minimal buffers to store message cells or packets of data. In an exemplary embodiment, the data rate on the SCAPE*Net ports is on the order of 250 Mbps or more, when employing a low voltage differential signaling (LVDS) physical interface, as implemented on a COTS SerDes (Serializer/Deserializer) or ASIC device.

Figure 4A:
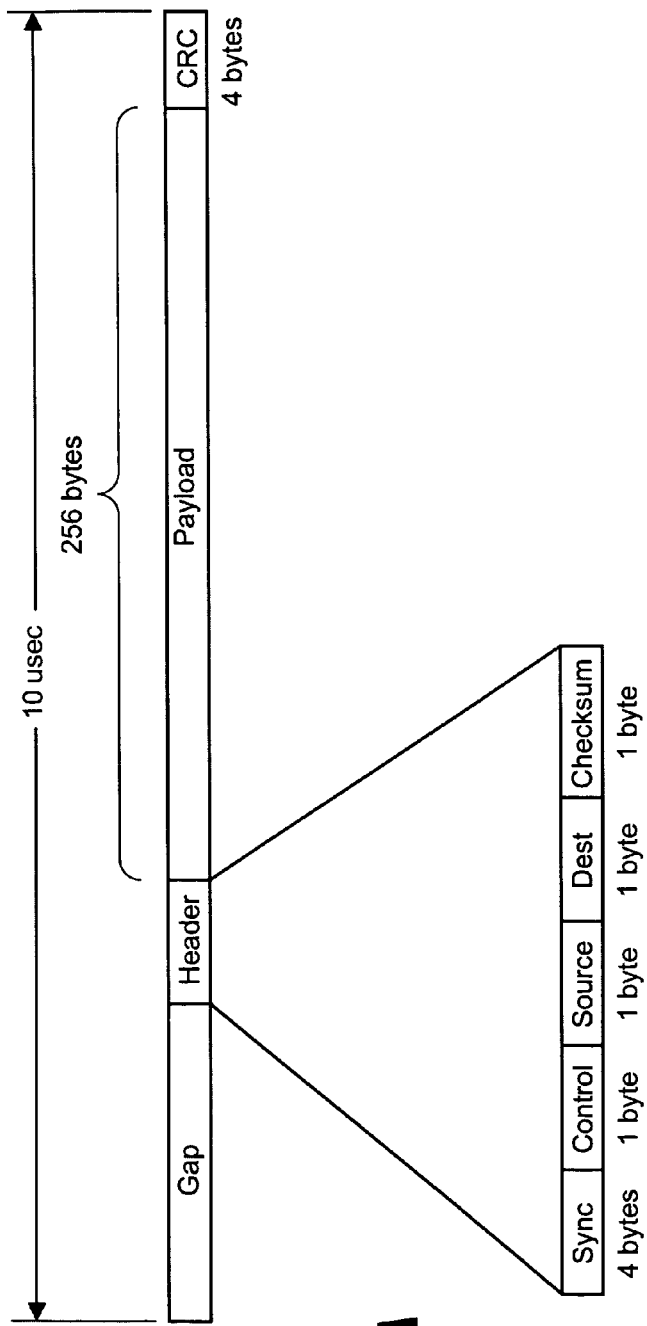
FIG. 4A is a diagram of a packet transmitted by the network of the present invention.

FIG. 4A describes an example packet format for the network layer of the SCAPE*Net switched fabric network. The data packet length for the network of the present invention, which could be of any length, is preferably 256 bytes. The header is 8 bytes, comprising a 4 byte Sync portion for synchronization functions, a 1 byte Control portion for control functions, a 1 byte Source portion, a 1 byte Destination portion, and a 1 byte Checksum portion. The data packet has a trailing 4 byte field for error checking, such as by Cyclic Redundancy Check (CRC). Packet routing is accomplished in each switched fabric element by receiving the packet header, computing a header checksum based on the received header information, and verifying that it matches the received header checksum, examining the destination portion to determine where the packet should be routed, and retrieving information from a locally stored routing table indicating the output port to which the packet should be connected to be propagated toward its destination node.

The topology of the present invention employs and is conducive to wormhole routing of packets. Wormhole routing is a system of simple routing in computer networking based on known fixed links, typically with a short address. In wormhole routing the packets are sent over the links, and because the known address is so short, the address can be translated before the complete message arrives. This allows the router to quickly set up the routing of the actual message and then bow out of the rest of the conversation. Wormhole routing is similar to Asynchronous Transfer Mode (ATM) or Multi-Protocol Label Switching (MPLS) forwarding, with the exception that the message does not have to be queued.

Wormhole routing is advantageously used in the SDRP processor nodes in the present invention, as the blocks are connected seamlessly. By employing nodes of the present invention in a fixed pattern relative to its neighbors, the number of hops from one SDRP node to another are reduced. Each node is given a number (typically only 8-bit to 16-bit), which is its network address, and messages to nodes are sent with this number in the header. When the message arrives at an intermediate node for forwarding, the switched fabric router within the node very quickly examines the header, sets up a circuit, or establishes a routing path, to the next node processor, and then bows out of the conversation. In this way, the messages rarely if ever have any delay as they travel though the network, so the speed is similar to the speed at which the nodes would function if they were directly connected.

Thus, in all embodiments of the present invention, the architecture of the present invention is conducive to wormhole routing, so wormhole routing of data packets may be advantageously employed.

Figure 4B:
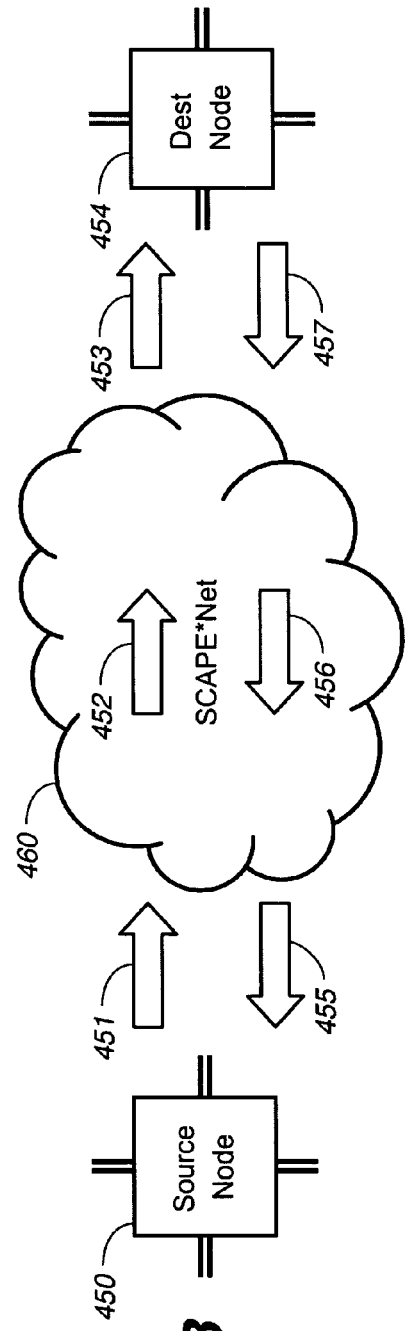
FIG. 4B is a diagram of the acknowledgement of a packet transmitted by the network of the present invention.

FIG. 4B describes the transport function of the SCAPE*Net switched fabric network. The transport layer of the SCAPE*Net protocol is responsible for insuring that data is delivered reliably from the source node 450 to the destination node 454. A packet 451 such as the kind of packet disclosed in FIG. 4A is formed by the source node 450 and is propagated through the network at point 452, through the switched fabric network 460, which may consist of a plurality of switched fabric nodes that forward the packet to its designated destination 454. When the packet emerges from the switched fabric network at point 453, it is received by the destination node 454 where the frame check sequence CRC is verified to determine whether a transmission error has occurred between the source node 450 and the destination node 454. If no CRC errors are detected, it is presumed that the data packet has no errors. At this point, the destination node 454 generates an ACK packet at 457 consisting of a packet header with a positive acknowledgement control code and no payload. This ACK packet is very short and will be propagated back to the original source node 450 through the switched fabric network 460. If a CRC error is discovered, the destination node 454 generates a NAK packet at 457 with a negative acknowledgement control code and no payload. A useful error recovery mechanism in the event of a lost ACK or NAK packet is a time out, whereby if a fixed timer resident in the source node expires before an ACK or NAK is received, a NAK of the outgoing packet 451 is assumed and recovery must be initiated.

In terms of latency of transmission of data packets in an exemplary embodiment of the present invention, with a packet length of 256 bytes and some inter-packet gap, the total time to transmit a packet will be on the order of 10 μsec (microseconds). Assuming a header length of 8 bytes, the latency through a router will be on the order of 0.3 μsec. A route across a relatively large grid network might encounter 10 switch delays for a total of 3 μsec. With a return route of the same 3 μsec., approximately 16 μsec. would be required for transmission of a 256 byte packet and an acknowledgement to the transmitting node of correct reception of the packet by the receiver. This suggests a timeout on the order of 20-25 μsec. to maximize the switched fabric bandwidth.

Figure 5:
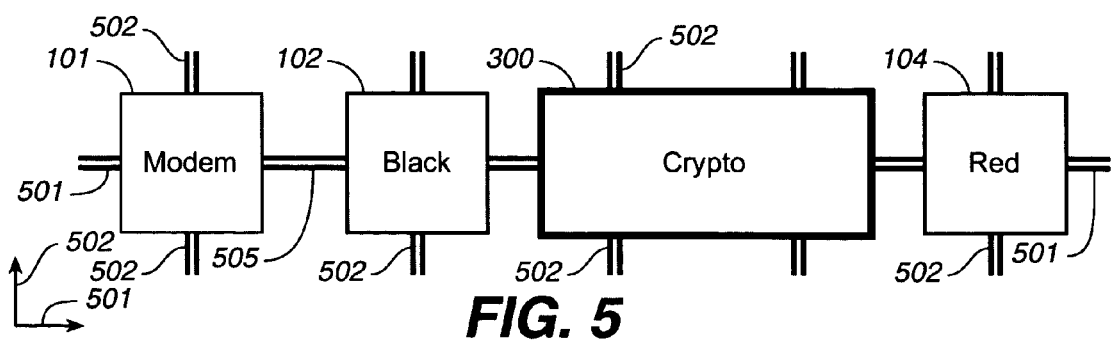
FIG. 5 is a schematic of a basic building block configuration used in a JTRS-style SDR of the present invention.

Turning attention now to FIG. 5, there is shown a schematic of one of the basic building block configurations used for a JTRS-style SDR forming the SCAPE*Net of the present invention, which is a four-block SDRP block building block. This configuration is flexible as it employs a modem block 101, such as the known per se modem block 101 of FIG. 1 to provide the baseband data stream interface, a Black processor block 102, such as the Black processor block 102 of FIG. 1, for black message processing, a Crypto block 300 of the kind disclosed in FIG. 3 comprising separate black and red I/O ports, and a Red processor block 104, such as the Red processor block 104 of FIG. 1, for red message processing. The four blocks are connected to one another as shown in the East-West direction, labeled 501, forming a four-block SDRP block building block 500, with alternate ports of ingress and egress of data in the North-South direction, labeled 502, which are useful for communication between like building blocks, as explained further herein. The Modem Block 101 is operatively connected to the West port 505 of the Black Block 102 and provides a stream of baseband data to the Black Block 102. This stream may be in the form of a steady flow of single data words, or it may consist of a block of multiple data words moved to the Black Block memory. The Modem Block 101 performs and manages the modulation and demodulation of waveforms used in radio through the port connected to the Black processing block 102. The modulation may be done by other equipment operatively connected to the Modem Block, such as a: upconverter/downconverter, mixer, reference oscillator, Phase Locked Loop (PLL), heterodyne circuit, matched filter, amplifier and the like typically used in radio. The kind of modulation performed by the Modem Block in FIG. 5 includes but is not limited to meaning managed resources for waveform modulation and demodulation schemes of the kind used in radio transmission, e.g., Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), Orthogonal Frequency Division Multiplexing (OFDM) and the like. The basic movement of data in FIG. 5 is West to East for the received data flow, and East to West for the transmitted data flow. North to South flow is generally reserved for communication between similar four-block SDRP block building blocks, to allow, inter alia, for multi-channel configuration and scalability, as disclosed further herein.

Figure 6:
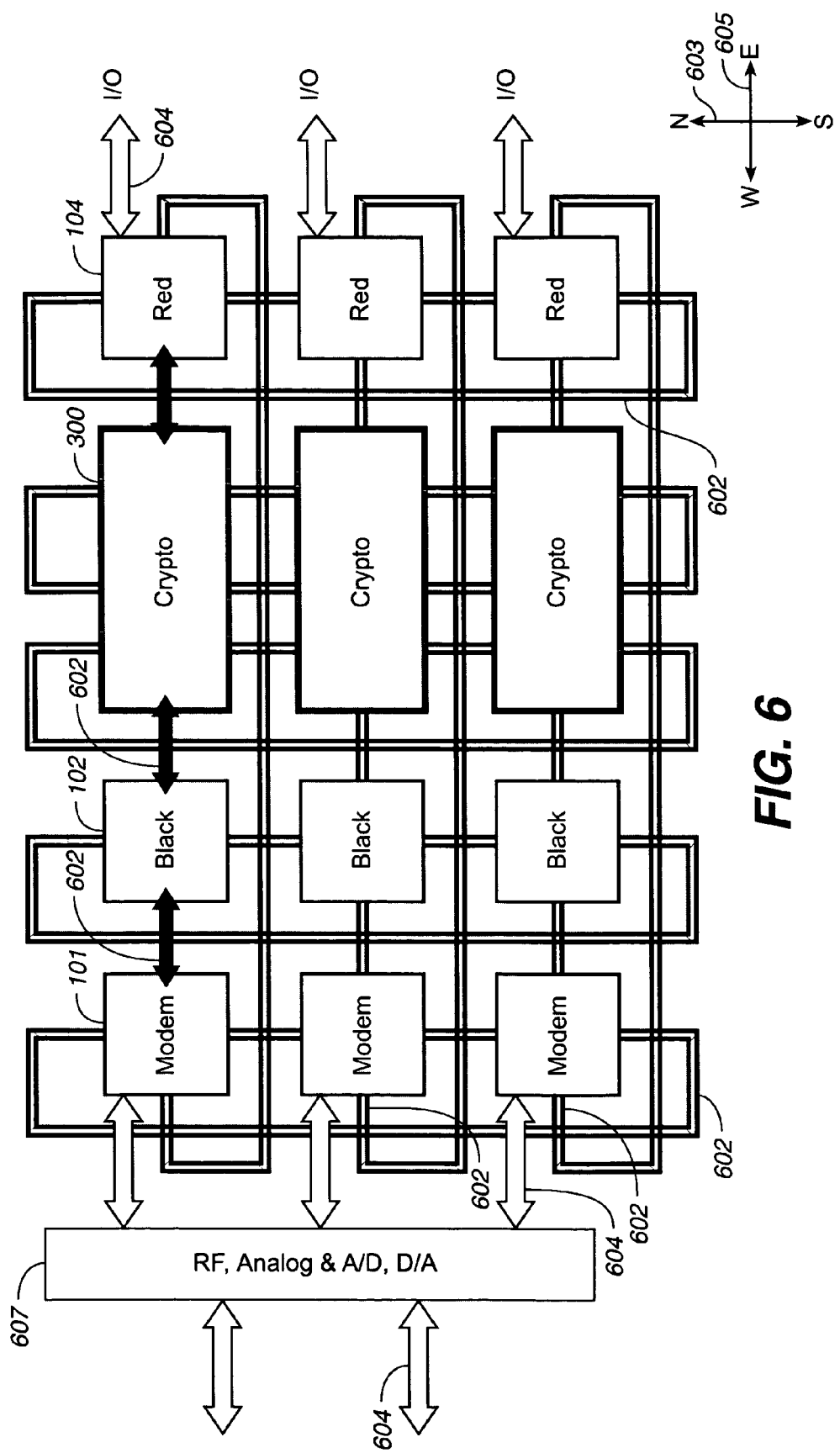
FIG. 6 is a schematic of a preferred embodiment for a SCAPE*Net architecture for an orthogonal planar topology for multichannel configurations using the teachings of the present invention.

Thus, in the embodiment of FIG. 6 there is shown a schematic of the SCAPE*Net architecture for multichannel configurations employing four-block SDRP block building blocks of the kind disclosed in FIG. 5 in an orthogonal planar topology. The utility of the SCAPE*Net architecture is more evident for multichannel configurations as illustrated here, with like numbered reference numbers indicating previously defined elements. The primary data flow for an individual channel is indicated by the block arrows and double lines 602, which provides the path for data to move between the various processing subsystems, and block arrows 604 providing I/O and interface data path communication. Communication between SDRP blocks (North-South) is via the connections indicated by the double lines running north and south, e.g., in vertical north-south direction 603 which is orthogonal to horizontal east-west direction 605. Interchannel communication is generally in the north-south direction 603, and interchannel communication is generally in the east-west direction 605.

The RF, analog, and analog-to-digital converter (A/D) and digital-to-analog converter (D/A) block 607 contains circuits that interface to an external radio antenna for receiving and transmitting RF signals, and convert the RF signals from analog form to the digital form that can be manipulated by the Modem signal processing block 101. The Modem Block 101 is a programmable element of the Software Defined Radio and may consist of programmable logic such as an FPGA, a programmed DSP, or both. The Modem Block 101 converts the digital samples from the RF, analog, and A/D and D/A block to baseband data that may be manipulated and processed by the Black processor block 102. The Black processor block 102 is coupled to the black port 301 of the Crypto block 300 that is preferably programmable to implement one or more cryptographic algorithms. The Crypto block 300 performs cryptographic operations on the black data supplied to it by the Black processor block 102. Black data is either unclassified or encrypted so that it can be propagated across a wireless communication channel available to friend and foe alike with no concern for loss of sensitive data. The Crypto block 300 decrypts encrypted black data and converts it to red data, which is data that is classified and sensitive and must be protected from loss. The Red processor block 104 is connected to I/O facilities that are also classified and must be protected from loss. These I/O facilities are the intended users and generators of the classified data that the communication system exists to serve.

An important feature of the SCAPE*Net architecture of the present invention is that because of the interconnected grid architecture, the SDRP blocks can always find an adjacent SDRP block, such as in both the North-South and East-West directions for the FIG. 6 embodiment. Consequently, most communications will not request a route on a single port of a router simultaneously, which provides significant spacial reuse. In the example shown here, each of the block arrows could be communicating simultaneously, as well as with similar paths on the other channels. The effective bandwidth of this topology can be extraordinarily high, in excess of 250 Mbps multiplied by the number of simultaneous communications. The inputs and outputs (I/O) to the array might be directly coupled to specific processing blocks, such as the Red Block 104 as shown in FIG. 6 by way of example.

As shown by way of example in FIG. 6 of the present invention, an architectural approach has been conceived for implementation of a low power, scalable computing environment. This computing environment may be applied to a number of application areas including hosting software defined radio (SDR) waveform application software such as the SCA as well as more general computing applications.

In FIG. 6, low power processors residing in Modem, Black, Crypto and Red blocks, such as AAMP, ARM or XScale processors, are connected by a high speed, low power embedded network, with the network and transport protocol implemented in hardware, as shown by the symbolic double lines 602. The network utilizes low voltage differential signaling (LVDS) for high speed and low power. A "wormhole router" mechanism is used to implement a switched fabric interconnection topology that allows for extremely high network utilization with low latency. Packet routing is accomplished by examining the header of the packet, identifying the appropriate router output port, and immediately sending the packet out on that port. The transport protocol can provide reliable delivery by requiring the destination port to send an ACK or NAK upon receipt of the complete packet.

An example implementation might communicate at data rates of 250 Mbps or more. The time to propagate across a relatively large embedded grid network, transmit an entire packet, and receive an ACK would be on the order of 16 μsec (microseconds). Recovery from loss of a packet could be handled by use of a fixed timeout of 25 μsec. A simple doctrine might be to allow up to 4 retries, which would result in a bounded latency of 100 μsec. Loss of a packet could occur if two packets attempt to use the same output port of a given switch node. The first packet arriving would be successfully routed; the second would be blocked and would be lost. The timeout approach would recognize the lack of acknowledgement to initiate a retry and recover from this transient blocked condition. Alternatively, a buffer could be provided to store a single later arriving packet while allowing the earlier arriving packet to be routed through the switch node to minimize the probability of loss of a packet and improve the performance of the switched fabric network.

Figure 7:
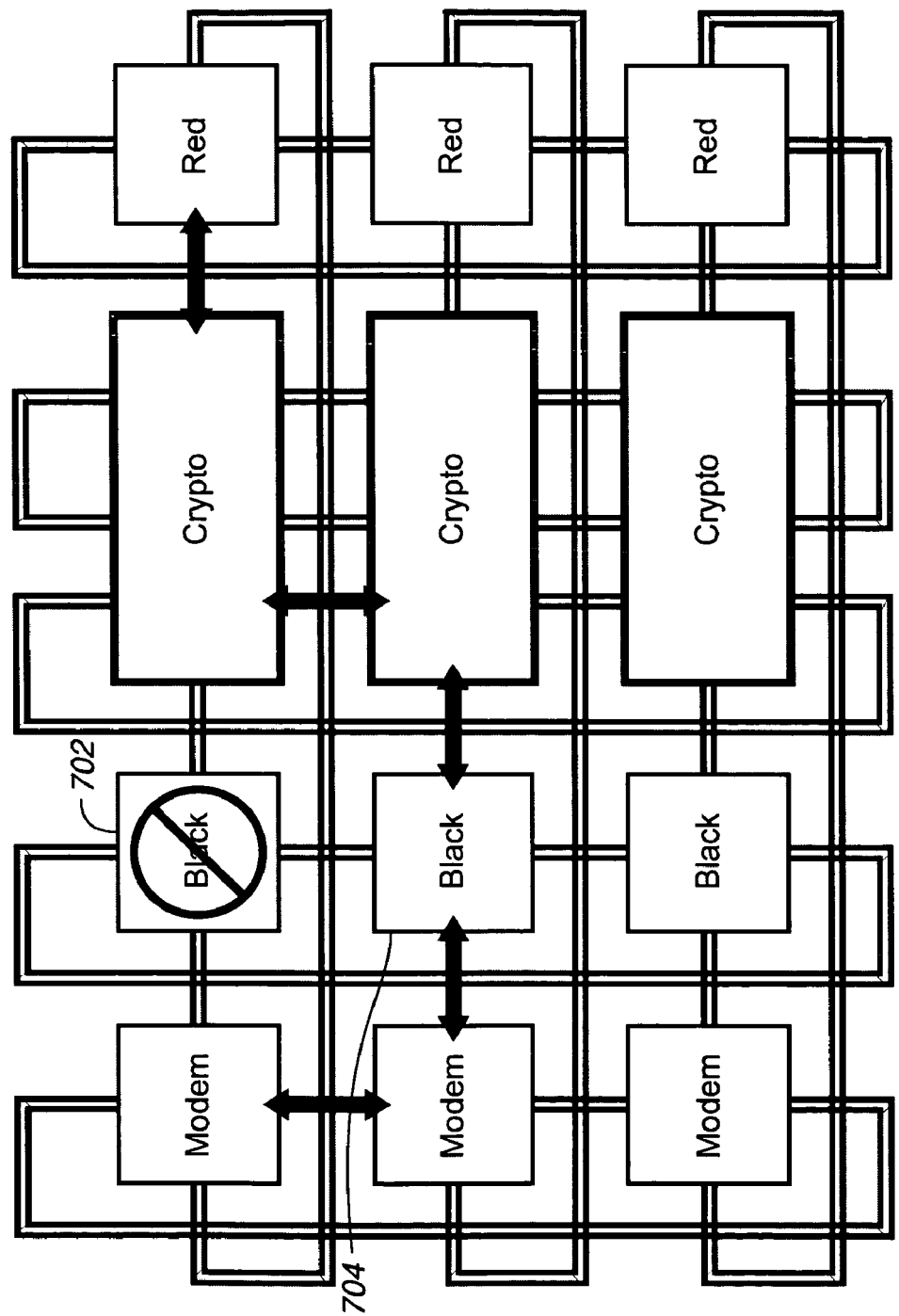
FIG. 7 is a schematic of the SCAPE*Net architecture illustrating the effect of a loss of function of one of the computing elements.

As illustrated in FIG. 7, which is identical to FIG. 6 in similar structural elements, an important capability of the computing grid architecture is the ability to tolerate loss of function of various of the computing elements and still have the network function, which can be termed a "self-healing", fault-tolerant, or fail-safe operation. In the example shown here, a Black processor fails, as indicated by the crossed out icon at Black processor block 702. With relatively little loss of speed, the function of that black processor could be redeployed on an alternate black processor in the SCAPE*Net topology grid. The most likely system organization would either have one or more spare processors, or spare computing capacity available on a functioning processor, that could be deployed in a peer-to-peer fashion in the event of a failure, such as using the Black processor block 704, which is found along the North-South axis to the failed Black processor block 702. Thus, data can be routed along the North-South ports between the failed Black processor block 702 and the backup Black processor block 704, to allow the network to recover the functions of the failed Black processor block 702. In general, a backup processor node, such as for the Black processor node 702, may be topologically located anywhere in the SCAPE*Net grid, but preferably is in the nearest similar neighboring node. Recovery from the loss would involve loading an alternate network configuration into the routers so the path to the alternate computing resource would be established (including establishing all necessary communications between other SDRP blocks that were in communication with the failed Black processor block), and data loading the alternate processor with the software required to perform its function associated with the new backup Black processor block. The alternate network configurations are examples of a use of the North-South routing facilities of the switched fabric nodes shown in the figures.

For safety critical systems, alternate network and processor configurations could be identified and analyzed in advance and loaded upon detection of a loss of a computing resource by suitable software. Another alternate network configuration primarily intended for high reliability or high integrity applications, including safety of life, is to define primary and one or more alternate nodes in the SCAPE*Net to take over should there be a failure in the primary or alternate nodes. These alternate nodes could either be simultaneously routed and processing such that the downstream nodes would have redundant information paths or they could be standby nodes that only route and process information upon detection of a failure of the primary node.

The present invention can further be provided with Multiple Independent Levels of Security (MILS) capability.

MILS capability is important for systems that must process information of mixed classification levels that must be protected from loss. MILS may be implemented in the SCAPE*Net network by including classification information in the packet header illustrated in FIG. 4A. A source node may transmit a secret classified packet to a destination node by placing an appropriate control word in the packet header that may be verified by the network routing infrastructure before being delivered to the destination.

Figure 8:
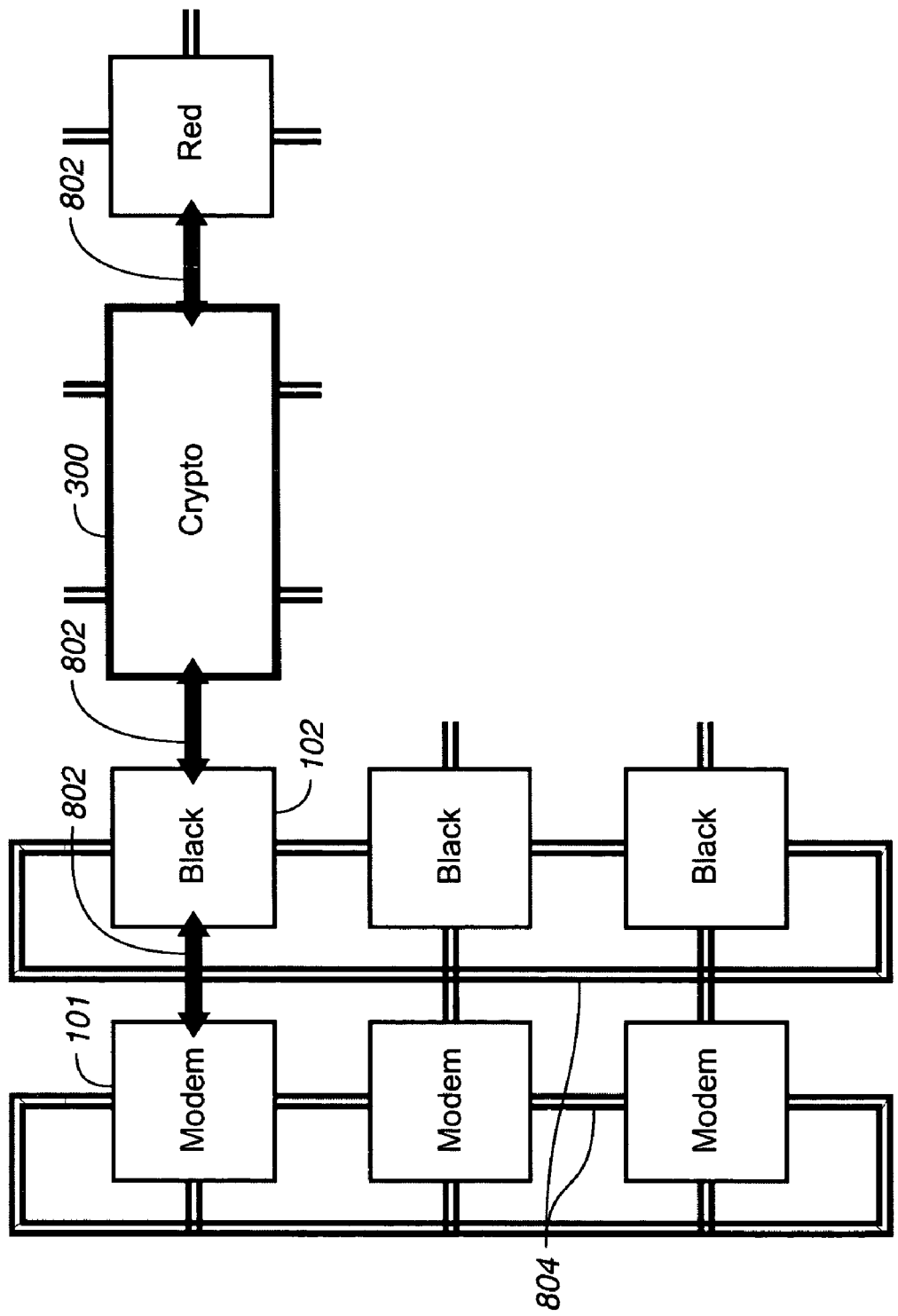
FIG. 8 illustrates a SCAPE*Net topology that supports dual use civilian and military applications.

Various configurations of JTRS-style computing resources can be supported by this architecture. Shown in FIG. 8 is an example of a configuration that could support a mix of unclassified communication waveforms such as the type used by commercial avionics along with a military-style waveform that requires cryptographic services and red processing. Thus, the Black Block processor 102 communicates with the Modem Block 101 as shown along the East-West ports in data path 802, with the Black Blocks and Modem Blocks in communication with one another through their North-South ports in data path 804 as shown, and a Crypto block 300 communicates with the Black Block 102 along its East-West ports. Likewise, the Crypto and Red Blocks communicate with one another through their East-West ports leaving free their North-South ports for communication with the rest of the switching fabric and with one another. In this way, the SCAPE*Net topology can support dual-use, both civilian and military applications. The military applications would require the presence of a Crypto block in a channel, while the civilian application typically would not, but the topology of FIG. 8 could simultaneously support both civilian and military applications with suitable software. A further description of this configuration is found in pending U.S. patent application filed concurrently with this patent application and commonly assigned, entitled "Commercial Software Defined Radio with Military Capabilities", Ser. No. 11/238,824, incorporated herein in its entirety.

Figure 9:
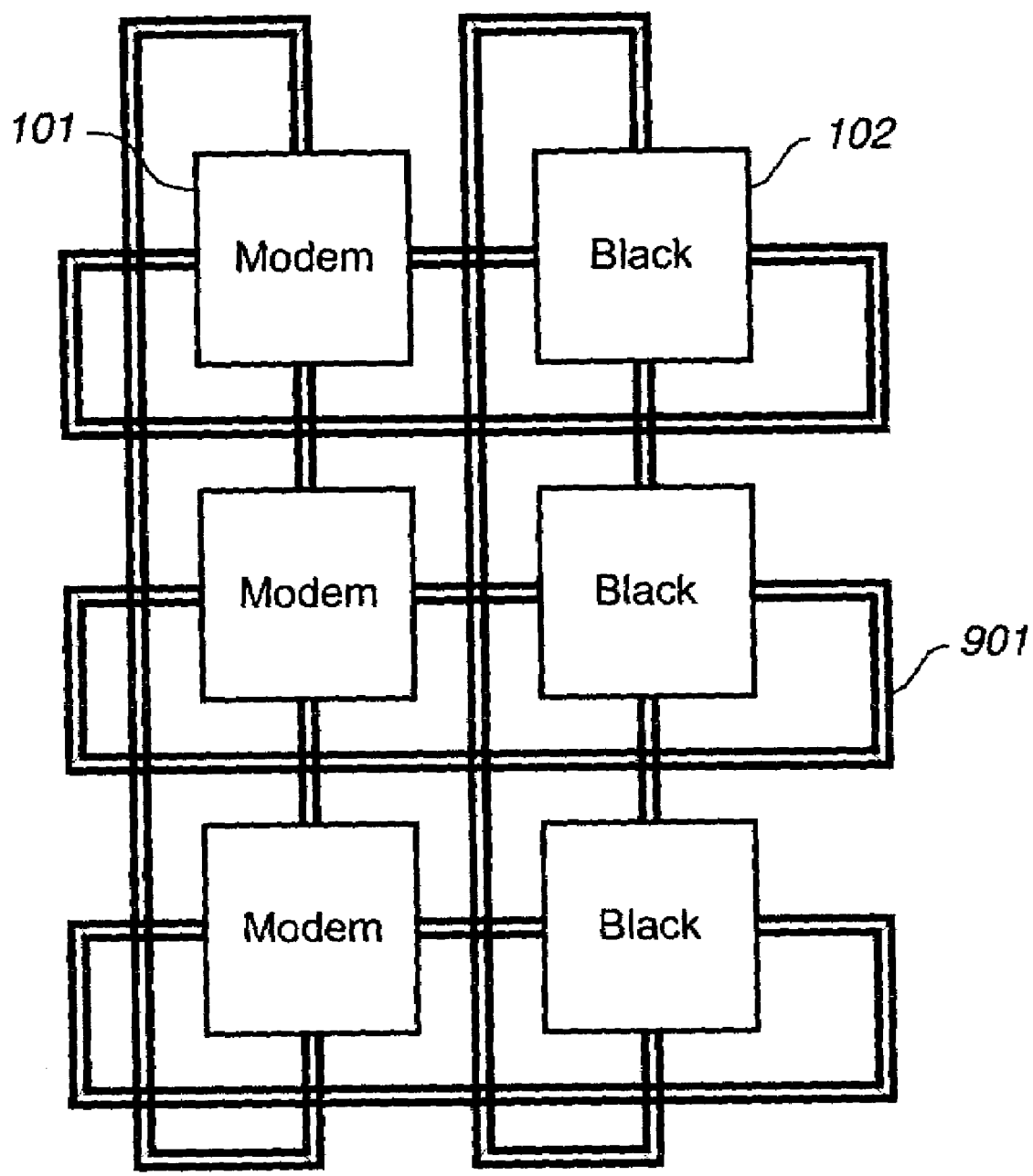
FIG. 9 illustrates a SCAPE*Net topology that supports three independent SDR channels.

Turning attention to FIG. 9, there is shown a configuration of processor building blocks of the present invention to support 3 independent software defined radio (SDR) channels of the unclassified kind, employing Modem and Black Blocks 101, 102, respectively. Each of these channels would be in operative communication with one another as shown by the double lines 901 running along the North, South, East and West ports of the Modem and Black Blocks as shown. The blocks are arranged in a switched fabric peer-to-peer type network arrangement and suitable software can be designed to pass control to one of the three channels when a user desires. Alternatively, a global processor can directly manage resources, assign waveforms, and pass control to each group of blocks.

Figure 10:
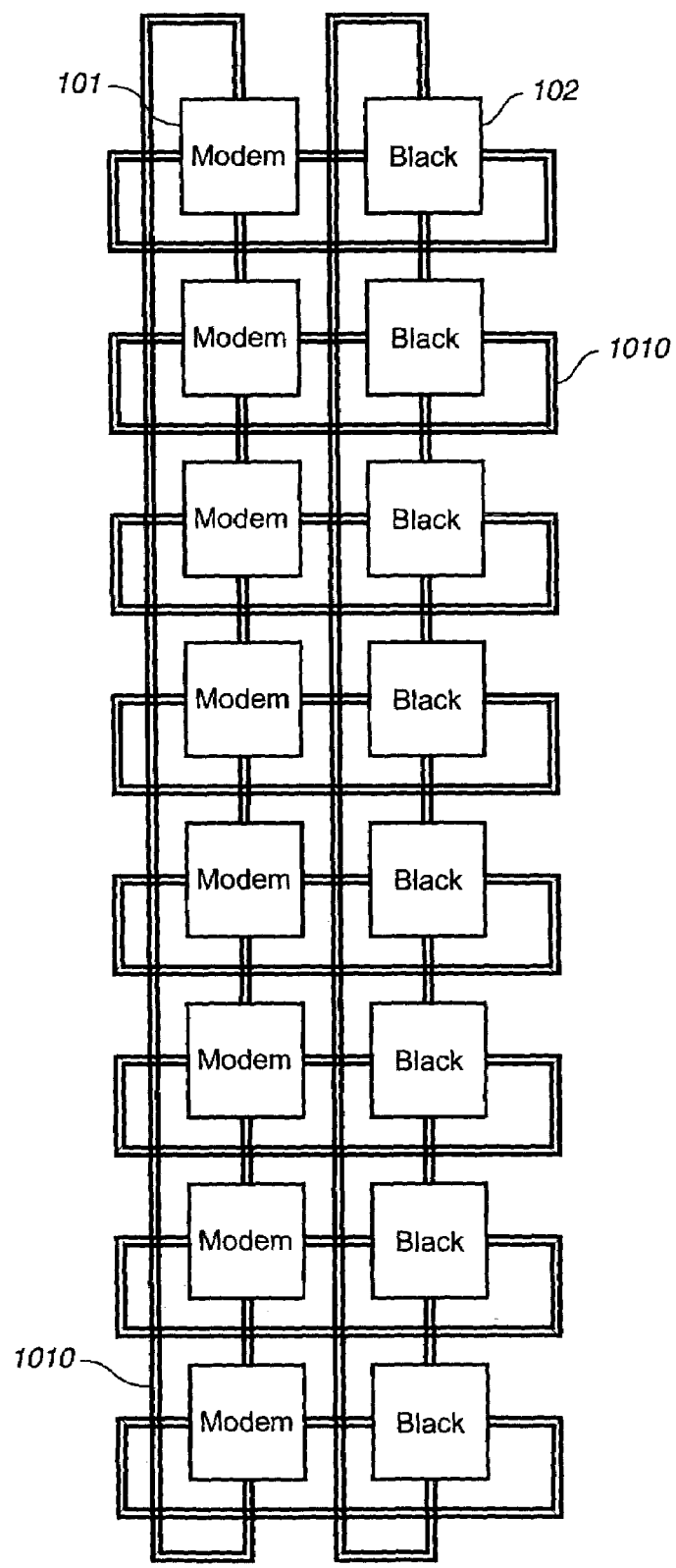
FIG. 10 illustrates a SCAPE*Net topology that supports eight independent SDR channels.

The FIG. 10 embodiment is also a switched fabric peer-to-peer network as in the FIG. 9 topology. This system configuration would support up to 8 SDR channels, which can be graphically described as running East to West horizontally, and in FIG. 10 comprises Modem blocks 101 and Black Blocks 102, connected with their North and South and East and West ports in matrix fashion as shown, with North and South connected and East and West connected, as indicated by the double lines 1010. Also a Modem/Black/Crypto/Red layout may be used in lieu of a Modem/Black layout, if secure communication and encryption is desired. In the present invention, the existence and definition of a regular, repeating layout, such as, for example, Modem/Black or Modem/Black/Crypto/Red, is beneficial for system composition and ensures advantageous network addressing, suitable for wormhole routing. Both the FIGS. 9 and 10 topologies employ wormhole routing of data packets.

Further, although the present invention has been described in terms of the preferred embodiments above, numerous modifications and/or additions to the above-described preferred embodiments would be readily apparent to one skilled in the art. Thus, rather than three channels as in FIG. 9 and eight channels as in FIG. 10, "N" channels can be constructed by inserting additional building blocks in a similar topology as shown in FIGS. 9-10, to construct an N-th SDR channel network.

As can be seen from the above, the interconnected switched fabric orthogonal planar grid topology of the present invention allows communication between different or disparate SDRP blocks from a set (e.g., Modem, Black, Red and Crypto, as defined herein) along the "East-West" direction of the grid, while allowing communication between the same SDRP blocks from the set along the "North-South" direction of the grid, which is generally orthogonal to the East-West direction, in a rectilinear layout, but in a topographical sense "North-South" simply means in a direction (e.g., vector space basis) distinct from "East-West"; consequently if the axis of "North-South" was in a plane 45 or 135 degrees from "East-West", rather than 90 degrees, it would in no way detract from the teachings of the present invention. Nor would it matter if the grid was curvilinear rather than Euclidean; only that the North-South and East-West directions are distinct as taught herein. The edges of the grid are connected, thus topologically forming a cylinder or elongated torus. Each of the SDRP blocks can communicate with a neighboring SDRP block as shown. The net effect is to allow a switching fabric network that is self-healing, scalable and with several paths of communication between nodes in the grid. Collectively the network forms a "wormhole router" compatible configuration, and the switched fabric network topology of the present invention allows for extremely high network utilization with low latency. In the most general case, the SDRP blocks can communicate with other SDRP blocks that are not necessarily neighboring nodes in the grid.

Figure 11:
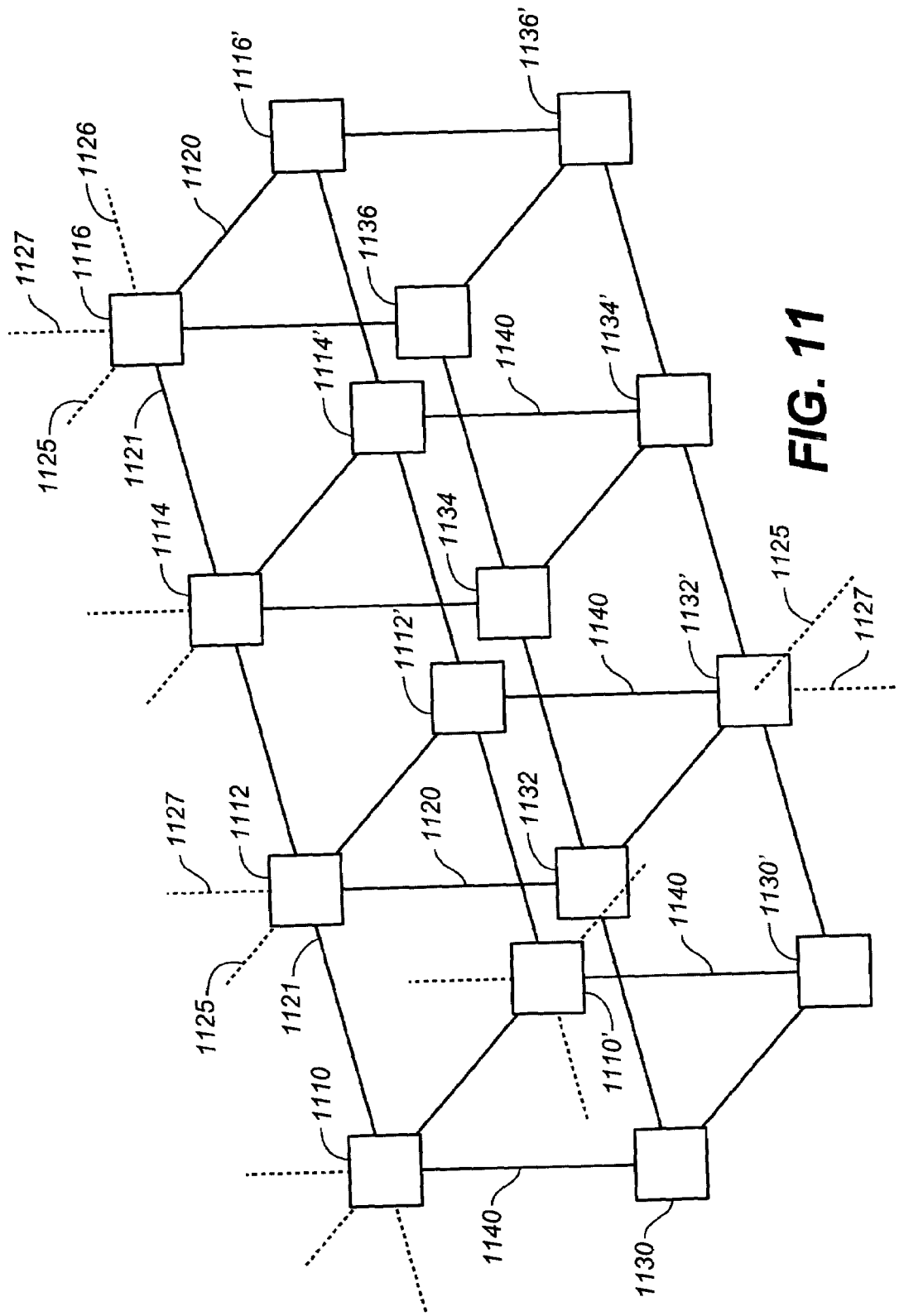
FIG. 11 illustrates a SCAPE*Net architecture for an orthogonal interconnect cube topology.
Figure 12:
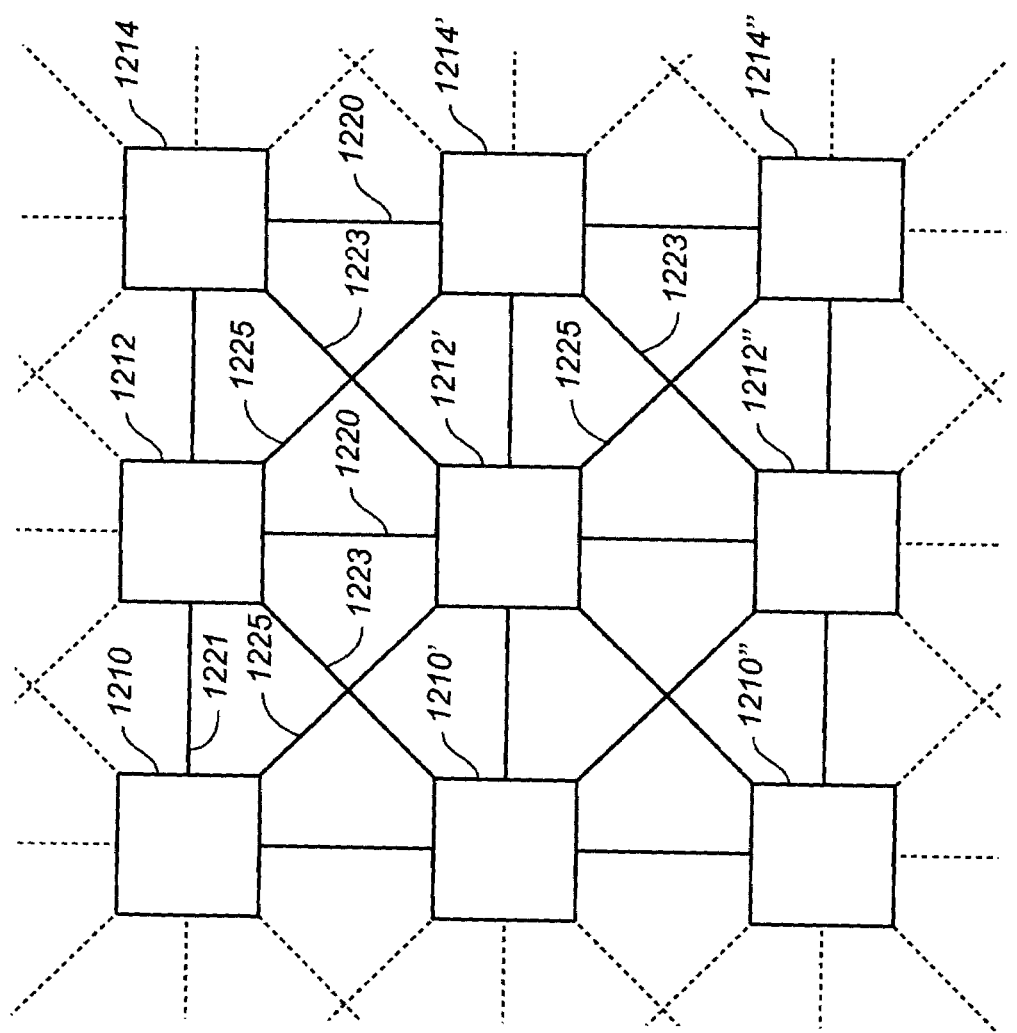
FIG. 12 illustrates a SCAPE*Net architecture for a diagonal interconnect topology along a planar surface.

While a preferred architecture topology for the present invention is the repeating, orthogonal planar topology of the torodial shape suggested by FIG. 6, because this architecture lends itself most simply and readily to wormhole routing with a fewer number of hops and complexity than other architectures, it is within the scope of the present invention to have other architectures, as shown by way of example in FIGS. 11 and 12.

Turning attention to FIG. 11, there is shown a SCAPE*Net architecture for an orthogonal interconnect cube topology that constitutes a three-dimensional grid. The SDRP blocks shown, such as SDRP blocks 1110, 1112, 1114, 1116, extending along the orthogonal cube vertice edge, may be disparate blocks selected from the group comprising Modem, Black, Red and Crypto blocks, as defined herein, analogous to the SDRP blocks extending along the East-West direction in the FIG. 6 embodiment. The SDRP blocks 1110', 1112', 1114', 1116', extending parallel to SDRP blocks 1110, 1112, 1114, 1116, may be identical blocks to the parallel blocks on the same plane, thus SDRP block 1110' would be functionally identical with SDRP block 1110; SDRP block 1112' would be the same as SDRP block 1112, SDRP block 1114' would be identical with SDRP block 1114, SDRP block 1116' would be the same as 1116, and so on, as the cube lattice extends in three-dimensions as indicated by the dashed lines 1125, 1126, 1127, and may have the edges of the lattice wrap around and meet, as in the torus configuration of FIG. 6. Similarly, there exist North-South and East-West planar interconnections such as 1120, 1121 connecting the SDRP blocks. On the lower level, regarding SDRP blocks 1130, 1132, 1134, 1136, these blocks may also be SDRP blocks comprising the set of disparate blocks selected from the group comprising Modem, Black, Red and Crypto blocks, as defined herein, and may or may not be identical with the upper SDRP blocks 1110, 1112, 1114, 1116 on the upper level. Likewise, the lower level parallel SDRP blocks 1130', 1132', 1134', 1136' may be functionally identical to the parallel SDRP blocks 1130, 1132, 1134, 1136. The different pairs of blocks 1110, 1112, 1114, 1116, and 1110', 1112', 1114', 1116' on the upper level of the cubes lattice and the blocks 1130, 1132, 1134, 1136 and 1130', 1132', 1134', 1136' on the lower level of the cubes are connected by Up-Down interconnects 1140.

Thus, as can be seen in FIG. 11, each SDRP block node in the cube is orthogonally connected to six other nodes, as the cubic architecture extends in all directions, as suggested by the dashed lines 1125, 1126, 1127, which extend orthogonally, three-dimensionally, in the XYZ directions. In this embodiment, the SDRP blocks would be suitably constructed to have ports for communication with six other nodes. Though not shown in FIG. 11, even more connections may be made in the cube topology, such as allowing for non-orthogonal connections (e.g., diagonal routing as for example a direct diagonal communication between SDRP blocks 1110' and 1130, or 1114' and 1134). In the case of such diagonal connections, each node may have more than six ports, e.g., 10 or 14 ports, for communicating with immediately adjacent neighboring SDRP blocks along a diagonal line rather than orthogonal lines as shown in FIG. 11.

FIG. 12 illustrates a SCAPE*Net architecture for a diagonal interconnect topology along a planar surface. The SDRP blocks shown, such as SDRP blocks 1210, 1212, 1214 extending along the planar edge in an East-West direction, and may be disparate blocks selected from the group comprising Modem, Black, Red and Crypto blocks, as defined herein, analogous to the SDRP blocks extending along the East-West direction in the FIG. 6 embodiment. The SDRP blocks 1210', 1212', 1214', extending parallel to SDRP blocks 1210, 1212, 1214, and may be identical blocks to these parallel blocks, thus SDRP block 1210' would be functionally identical with SDRP block 1210; SDRP block 1212' would be the same as SDRP block 1212, SDRP block 1214' would be identical with SDRP block 1214, and so on, as the topology of the FIG. 12 embodiment extends in a plane in a repeating pattern as indicated by the dashed lines, and may have the edges of the topology wrap around and meet, as in the torus configuration of FIG. 6. Likewise, the SDRP blocks 1210", 1212", 1214", extending parallel to SDRP blocks 1210', 1212', 1214', and may be identical blocks to these parallel blocks, thus SDRP block 1210" would be functionally identical with SDRP block 1210'; SDRP block 1212" would be the same as SDRP block 1212', SDRP block 1214" would be identical with SDRP block 1214', and so on.

Similarly, there exist North-South and East-West interconnections such as 1220, 1221, respectively, connecting the SDRP blocks. In addition to the North-South and East-West interconnections there exist diagonal interconnections 1223 and 1225, which connected along the Northeast-Southwest and Southeast-Northwest directions, respectively, as shown. Thus, each SDRP block in the FIG. 12 embodiment has 8 ports to communicate with 8 neighboring SDRP blocks, rather than just four neighboring SDRP blocks as in the FIG. 6 embodiment.

Though preferably the topology of the FIG. 6 embodiment is potentially superior to the FIG. 11 and FIG. 12 embodiments for wormhole routing, both the FIG. 11 and FIG. 12 embodiments may have wormhole routing, as explained herein.

Further, while each of the SDRP blocks in a preferred embodiment of the invention generally have a piece of hardware associated with them, it is possible, using the teachings of the present invention and as processing power becomes cheaper, to construct a virtual switching fabric network where each SDRP block is a virtual node, existing only in software and in memory, and each SDRP virtual node sharing a physical piece of hardware with other SDRP virtual nodes, suitably multiplexed together. Thus, virtual and physical switching fabric nodes can be suitably interchanged.

It is intended that the scope of the present invention extends to all such modifications and/or additions and that the scope of the present invention is limited solely by the claims set forth below.

We claim:

1. An architecture for a SDR communications system, comprising:

a plurality of processors, a switching fabric comprising a plurality of nodes, each of said nodes comprising at least one switching element associated with at least one of said processors;

said plurality of nodes connected to one another in a grid; wherein:

said nodes of said switching fabric are topologically organized so that each of said nodes communicates with at least one other node of said plurality of nodes, said grid topologically extends in at least distinct North-South and East-West directions, and each of said nodes communicates with at least one node from said plurality of nodes that is a neighboring node along said North-South and East-West directions, said nodes comprise a distinct set of Software Defined Radio Processor (SDRP) blocks controlled by software;

each of said SDRP blocks from said set connected to another neighboring SDRP block from said set, said SDRP blocks are connected to substantially identical SDRP blocks from said set along said North-South direction and connected to substantially different SDRP blocks from said set along said East-West directions, said SDRP blocks comprise a Modem Block having circuitry to convert a sampled analog signal into digital baseband data; a Black Block having a processor that processes data received by said Black Block that is encrypted, a Red Block having a processor that processes data received by said Red Block that is sensitive data that must be encrypted; a Crypto Block having circuitry to encrypt data received by said Crypto Block, using cryptographic algorithms, the Crypto Block has ports along said North-South direction and ports along said East-West direction, said Crypto Block disposed between said Red block and said Black Block and communicating with said Red and Black Blocks along said East-West direction via said East-West ports, and communicating with another plurality of adjacent Crypto Blocks along said North-South directions via said North-South ports; and, said Crypto Block is comprised of a Black Block and a Red Block operatively joined together and communicating with one another; and, the Black and Red Blocks each have ports along said North-South direction and ports along said East-West direction; said Black and Red Blocks topologically adjacent to at least one other Black and Red Block;

said Black and Red Blocks communicating with neighboring SDRP blocks according to the following: Black Blocks communicate with adjacent neighboring Black Blocks via said North-South Black ports; Red Blocks communicate with adjacent neighboring Red Blocks via said North-South Red ports; Black Blocks communicate with at least one of said Modem Blocks, Red Blocks and Crypto Blocks via said East-West Black ports; and Red Blocks communicate with at least one of said Modem Blocks, Black Blocks and Crypto Blocks via said East-West Red ports.

2. The invention according to claim 1, wherein:
said grid topologically extends in a plane having distinct North-South, East-West, Northeast-Southwest and Southeast-Northwest directions, and each of said nodes communicates with at least one node from said plurality of nodes that is a neighboring node along said North-South, East-West, Northeast-Southwest and Southeast-Northwest directions.

3. The invention according to claim 2, wherein:
said nodes are selected from a distinct set of Software Defined Radio Processor (SDRP) blocks controlled by software, said set of SDRP blocks forming said grid are SDRP blocks selected from the group consisting of: a Modem Block having circuitry to convert a sampled analog signal into digital baseband data; a Black Block having a processor that processes data received by said Black Block that is encrypted, a Red Block having a processor that processes data received by said Red Block that is sensitive data that must be encrypted; or a Crypto Block having circuitry to encrypt data received by said Crypto Block, using cryptographic algorithms.

4. The invention according to claim 1, wherein:
said grid topologically extends in three-dimensions having XYZ directions, and each of said nodes communicates with at least one node from said plurality of nodes that is a neighboring node along said XYZ directions.

5. The invention according to claim 4, wherein:
said nodes communicate with six other nodes spaced from one another orthogonally, and,
said nodes are selected from a set of Software Defined Radio Processor (SDRP) blocks controlled by software, said set of SDRP blocks forming said grid are SDRP blocks selected from the group consisting of: a Modem Block having circuitry to convert a sampled analog signal into digital baseband data; a Black Block having a processor that processes data received by said Black Block that is encrypted, a Red Block having a processor that processes data received by said Red Block that is sensitive data that must be encrypted; or a Crypto Block having circuitry to encrypt data received by said Crypto Block, using cryptographic algorithms.

6. The invention according to claim 1, wherein:
said nodes are selected from a set of Software Defined Radio Processor (SDRP) blocks controlled by software, said set of SDRP blocks forming said grid are SDRP blocks selected from the group consisting of: a Modem Block having circuitry to convert a sampled analog signal into digital baseband data; a Black Block having a processor that processes data received by said Black Block that is encrypted, a Red Block having a processor that processes data received by said Red Block that is sensitive data that must be encrypted; or a Crypto Block having circuitry to encrypt data received by said Crypto Block, using cryptographic algorithms.

7. The invention according to claim 1, wherein:
said SDRP blocks comprise a Modem Block having circuitry to convert a sampled analog signal into digital baseband data; and a Black Block and a Red Block each having a processor that processes data received; said Modem Block managing resources for waveform modulation and demodulation schemes used in radio data transmission, said waveform modulation and demodulation schemes selected from the group consisting of: Frequency Modulation (FM), Amplitude Modulation (AM), Single Side Band (SSB), Double Side Band (DSB), Vestigial Sideband (VSB), Frequency Shift Keying (FSK), Phase Shift Keying (PSK), Gaussian Minimum Shift Keying (GMSK), Quadrature Amplitude Modulation (QAM), Frequency Hopped Spread Spectrum (FHSS), Direct Sequence Spread Spectrum (DSSS), or Orthogonal Frequency Division Multiplexing (OFDM); and,
said Black and Red Block processors are selected from the group of processors comprising Rockwell Collins Advanced Architecture MicroProcessor (AAMP), ARM, XScale, Xtensa, ARC or DSP processors, and said Modem Block circuitry having programmable logic.

8. The invention according to claim 1, wherein:
said SDRP blocks comprise a Modem Block having circuitry to convert a sampled analog signal into digital baseband data; a Black Block having a processor that processes data received by said Black Block that is encrypted,
the Modem Block and Black Blocks each have ports along said North-South direction and ports along said East-West direction; said Modem and Black Blocks each topographically adjacent to at least one other Modem and Black block;
said Modem and Black Blocks communicating with neighboring SDRP blocks according to the following: Modem Blocks communicate with adjacent neighboring Modem Blocks via said North-South Modem ports; Black Blocks communicate with adjacent neighboring Black Blocks via said North-South Black ports; Black Blocks communicate with one of said Modem Blocks via said East-West Black ports, wherein each of said Modem Blocks and Black Blocks, when connected along said East-West direction, form a communication channel; wherein, there are "N" such communication channels, where N is equal or greater than 2, and,
said SDRP blocks further comprise a Crypto Block having circuitry to encrypt data received by said Crypto Block, using cryptographic algorithms; and a Red Block having a processor that processes data received by said Red Block that is sensitive data that must be encrypted; and,
said Red Block and Crypto Blocks each have ports along said North-South direction and ports along said East-West direction; said Red and Crypto Blocks each topographically adjacent to at least one other Red and Crypto block;
said Red and Crypto Blocks communicating with neighboring SDRP blocks according to the following: Red Blocks communicate with adjacent neighboring Red Blocks via said North-South Red ports; Crypto Blocks communicate with adjacent neighboring Crypto Blocks via said North-South Crypto ports; and,
said Crypto Blocks communicate with one of said Black Blocks and said Red Blocks via said East-West Crypto ports, wherein each of said Modem Blocks, Black Blocks, Crypto Blocks and Red Blocks, when connected along said East-West direction, from said communication channel, wherein,
at least one of said communication channels is a secure channel suitable for military communications that are compliant with the standard Application Program Interface (API) of the DoD Software Communications Architecture (SCA), said secure channel contains at least one of said Crypto Blocks; and, at least one of said communication channels is an unsecured channel not suitable for military communications that are compliant with a standard API, said unsecured channel on a different channel from said secure channel.

9. The invention according to claim 1, wherein:

said SDRP blocks pass data to one another by passing packets of data, said packets of data passed according to a protocol mode, said protocol mode selected from the group consisting of: store-and-forward mode with suitable buffers to store said packets of data, said packets having a header, trailer and payload; "pass-through" mode, where routing information contained in the packet header is analyzed, and upon determination of a routing path through said switch elements, the packet is routed to the appropriate SDRP port; or a "wormhole router" mode, and, wherein said SDRP blocks communicate with one another using a low voltage differential signaling (LVDS) physical interface, and said communication is greater than or equal to about 250 Mbps.

10. A method for constructing a Software Defined Radio (SDR) communications system comprising the steps of:

connecting a plurality of nodes into a network grid for SDR, each of said nodes comprising at least one switching element under the control of a at least one processor, wherein each of said nodes communicates with other neighboring nodes;

arranging said nodes to be disposed to be adjacent to said other neighboring nodes and to communicate with said neighboring nodes, according to a topology selected from the group consisting of: a planar topology comprising distinct East-West and North-South directions between the nodes; a planar topology comprising distinct East-West, North-South, Northeast-Southwest and Southeast-Northwest directions between the nodes; an orthogonal cube topology having orthogonal XYZ directions between the nodes; or, a cube topology allowing for non-orthogonal, diagonal directions between the nodes;

constructing a plurality of different nodes for connection into said grid, said nodes comprising a distinct finite set of Software Defined Radio Processor (SDRP) blocks;

controlling each of said SDRP through software under the control of said processor;

arranging said nodes according to said planar topology comprising distinct East-West and North-South directions between the nodes;

organizing a portion of said grid so that said SDRP blocks communicate with substantially identical SDRP blocks along said North-South direction and with substantially different SDRP blocks along said East-West direction, said distinct finite set of SDRP blocks comprise: a Modem Block having circuitry to convert a sampled analog signal into digital baseband data; a Black Block having a processor that processes data received by said Black Block that is encrypted, a Red Block having a processor that processes data received by said Red Block that is sensitive data that must be encrypted; and a Crypto Block having circuitry to encrypt data received by said Crypto Block using cryptographic algorithms;

organizing said SDRP blocks in said grid so that the following protocol is observed in substantially all of said grid;

the Crypto Block has ports along said North-South direction and ports along said East-West direction, said Crypto Block communicating with said Red and Black Blocks along said East-West direction via said East-West ports, and communicating with another plurality of adjacent Crypto Blocks along said North-South directions via said North-South ports;

the Black and Red Blocks each have ports along said North-South direction and ports along said East-West direction; said Black and Red Blocks each topographically adjacent to at least one other Black and Red Block; wherein, said Black and Red Blocks communicating with neighboring SDRP blocks according to the following convention: Black Blocks communicate with adjacent neighboring Black Blocks via said North-South Black ports; Red Blocks communicate with adjacent neighboring Red Blocks via said North-South Red ports; Black Blocks communicate with at least one of said Modem Blocks, Red Blocks and Crypto Blocks via said East-West Black ports; and Red Blocks communicate with at least one of said Modem Blocks, Black Blocks and Crypto Blocks via said East-West Red ports, and further comprising the steps of:

organizing said Modem, Crypto, Black and Red Blocks in said grid according to a substantially repeating pattern, along the East-West direction, said repeating pattern selected from the layout of blocks patterns consisting of: Modem/Black; Modem/Red; Modem/Black/Crypto/Red; or Modem/Red/Crypto/Black; further comprising the steps of:

providing a fail-safe plan for guaranteeing the integrity of said network in the event of a failure of one of the SDRP blocks, said fail-safe plan comprising the steps of loading, in software, an alternate network configuration into the routers, said alternate network configuration disclosing a path to another similar, alternate SDRP block to back up said failed SDRP block, said alternative SDRP block having a processor;

establishing a path to the alternate SDRP block, to allow communication between all SDRP blocks formerly in communication with said one failed SDRP block and said alternate SDRP block; and, loading the processor associated with said alternate SDRP block with the software required to perform any functions associated with the failed SDRP block.

11. The method according to claim 10, further comprising the steps of:

constructing a plurality of different nodes for connection into said grid, said nodes comprising a distinct finite set of Software Defined Radio Processor (SDRP) blocks;

controlling each of said SDRP through software under the control of said processor;

providing a fail-safe plan for guaranteeing the integrity of said network in the event of a failure of one of the SDRP blocks, said fail-safe plan comprising the steps of loading, in software, an alternate network configuration into the routers, said alternate network configuration disclosing a path to another similar, alternate SDRP block to back up said failed SDRP block, said alternative SDRP block having a processor;

establishing a path to the alternate SDRP block, to allow communication between all SDRP blocks formerly in communication with said one failed SDRP block and said alternate SDRP block; and, loading the processor associated with said alternate SDRP block with the software required to perform any functions associated with the failed SDRP block.

12. A SDR switching fabric architecture comprising:

means for switching;
means for controlling said switching means;
    said switching means and said controlling means forming a switching fabric comprising a plurality of nodes, wherein,
each of said nodes of said switching fabric communicate with at least three other nodes, said communication taking place along distinct topological directions, wherein,
said nodes are disposed to communicate with one another along said distinct topological directions according to a topology selected from the group consisting of:
a planar topology comprising distinct East-West and North-South directions between the nodes; a planar topology comprising distinct East-West, North-South, Northeast-Southwest and Southeast-Northwest directions between said nodes; an orthogonal cube topology having orthogonal XYZ directions between said nodes; or, a cube topology allowing for non-orthogonal, diagonal directions between said nodes, and,
said distinct topological directions comprise said planar topology comprising North South and East-West directions between said nodes;
each of said nodes comprise a distinct, finite, set of means for providing Software Defined Radio (SDR) functions; and
said nodes of said switching fabric are organized so that each means for providing SDR functions is connected to and in communication with a substantially identical means for providing SDR functions along said North-South direction, and with a substantially different means for providing SDR functions along said East-West direction and wherein:
said finite set of means for providing SDR functions comprises the set of:
modem means for providing modem functions to convert a sampled analog signal into a digital baseband signal; a first processor means for processing data received by said first processor means that is encrypted; a second processor means for processing data received by said second processing means that must be encrypted; and, a crypto means for encrypting data received by said crypto means, said encryption done according to cryptographic algorithms.

13. An architecture for a SDR communications system, comprising:
    a plurality of processors,
    a switching fabric comprising a plurality of nodes, each of said nodes comprising at least one switching element associated with at least one of said processors;
    said plurality of nodes connected to one another in a grid; wherein:
    said nodes of said switching fabric are topologically organized so that each of said nodes communicates with at least one other nodes of said plurality of nodes,
    said grid topologically extends in at least distinct North-South and East-West directions, and each of said nodes communicates with at least one node from said plurality of nodes that is a neighboring node along said North-South and East-West directions,
    said nodes comprise a distinct set of Software Defined Radio Processor (SDRP) blocks controlled by software;
    each of said SDRP blocks from said set connected to another neighboring SDRP block from said set,
    said SDRP blocks comprise a Modem Block having circuitry to convert a sampled analog signal into digital baseband data; a Black Block having a processor that processes data received by said Black Block that is encrypted,
    the Modem Block and Black Blocks each have ports along said North-South direction and ports along said East-West direction; said Modem and Black Blocks each topographically adjacent to at least one other Modem and Black block;
    said Modem and Black Blocks communicating with neighboring SDRP blocks according to the following: Modem Blocks communicate with adjacent neighboring Modem Blocks via said North-South Modem ports; Black Blocks communicate with adjacent neighboring Black Blocks via said North-South Black ports; Black Blocks communicate with one of said Modem Blocks via said East-West Black ports, wherein each of said Modem Blocks and Black Blocks, when connected along said East-West direction, form a communication channel; wherein, there are "N" such communication channels, where N is equal or greater than 2, and,
    said SDRP blocks further comprise a Crypto Block having circuitry to encrypt data received by said Crypto Block, using cryptographic algorithms; and a Red Block having a processor that processes data received by said Red Block that is sensitive data that must be encrypted; and,
    said Red Block and Crypto Blocks each have ports along said North-South direction and ports along said East-West direction; said Red and Crypto Blocks each topographically adjacent to at least one other Red and Crypto block;
    said Red and Crypto Blocks communicating with neighboring SDRP blocks according to the following: Red Blocks communicate with adjacent neighboring Red Blocks via said North-South Red ports; Crypto Blocks communicate with adjacent neighboring Crypto Blocks via said North-South Crypto ports; and,
    said Crypto Blocks communicate with one of said Black Blocks and said Red Blocks via said East-West Crypto ports, wherein each of said Modem Blocks, Black Blocks, Crypto Blocks and Red Blocks, when connected along said East-West direction, form said communication channel, wherein,
    at least one of said communication channels is a secure channel suitable for military communications that are compliant with the standard Application Program Interface (API) of the DoD Software Communications Architecture (SCA), said secure channel contains at least one of said Crypto Blocks; and,
    at least one of said communication channels is an unsecured channel not suitable for military communications that are compliant with a standard API, said unsecured channel on a different channel from said secure channel.

* * * * *